United States Patent [19]
Naef

[11] Patent Number: 5,871,721
[45] Date of Patent: Feb. 16, 1999

[54] USE OF S,S'-ETHYLIDENE DITHIOACETATE AS A PERFUMING AND FLAVORING INGREDIENT

[75] Inventor: Regula Naef, Carouge, Switzerland

[73] Assignee: Firmenich SA, Geneva, Switzerland

[21] Appl. No.: 784,868

[22] Filed: Jan. 16, 1997

[30] Foreign Application Priority Data

Jan. 25, 1996 [CH] Switzerland ................. 192/96

[51] Int. Cl.$^6$ ...................................... A61K 7/46
[52] U.S. Cl. ................. 424/76.4; 426/534; 512/5; 558/251
[58] Field of Search ............ 424/76.4; 426/534; 512/5; 558/251

[56] References Cited

U.S. PATENT DOCUMENTS

| | | |
|---|---|---|
| 3,879,562 | 4/1975 | Pittet et al. . |
| 4,220,561 | 9/1980 | Winter ................................. 252/522 R |
| 4,224,351 | 9/1980 | Sundt et al. ............................. 426/535 |
| 4,478,865 | 10/1984 | Demole et al. .......................... 426/535 |
| 4,940,728 | 7/1990 | Postley . |

FOREIGN PATENT DOCUMENTS

| | | |
|---|---|---|
| 360 141 252 | 7/1985 | Japan . |
| 402 275 815 | 11/1990 | Japan . |

OTHER PUBLICATIONS

L. Sternson, "1,1–Bix(acylthio)alkanes Formed by Base–Catalyzed Condensation of Thiol Acids", *J. Org. Chem.,* vol. 43, No. 23 (1978), pp. 4532–4533.

P. Schreier et al., "Über die quantitative Zusammensetzung natürlicher und technologisch veränderter Aromen", *Z. Lebensm. Unters.–Forsch.,* 164 (1977) pp. 188–193.

*Primary Examiner*—Thurman K. Page
*Assistant Examiner*—Brian K. Seidleck
*Attorney, Agent, or Firm*—Pennie & Edmonds LLP

[57] ABSTRACT

S,S'-ethylidene dithioacetate is used as a flavoring ingredient for giving the edible products in which it is incorporated not only a sulphurous but also a green, fruity, rich and even meaty quality. It has been particularly successfully used in grapefruit and other fruit flavorings. It can also be used in the preparation of perfuming compostions.

9 Claims, No Drawings

USE OF S,S'-ETHYLIDENE DITHIOACETATE AS A PERFUMING AND FLAVORING INGREDIENT

BRIEF SUMMARY OF THE INVENTION

The present invention relates to the perfume and flavorings industries. It relates more especially to the use of S,S'-ethylidene dithioacetate as a perfuming or flavoring ingredient.

It also relates to perfuming or flavoring compositions and products containing this compound as active ingredient.

Another object of the invention is a method of imparting a fruity taste to or improving or modifying the fruity taste of a flavoring composition or flavored product, wherein S,S'-ethylidene dithioacetate is added to said composition or product.

BACKGROUND OF THE INVENTION

S,S'-ethylidene dithioacetate or 1,1-bis(acetylthio)ethane is a compound of known structure. It was, for example, described by L. Sternson in J. Org. Chem. 1978, 43, 4532, in connection with a study of the behavior of thio acids in basic solutions. We have found no mention of the organoleptic properties of this compound in the prior art, however, nor have we found even a suggestion that it might be useful as a perfuming or flavoring ingredient.

Yet we have now found that this compound has very advantageous flavoring properties and that, in very dilute form, it develops tangs which are very useful for flavoring foods and beverages as well as other products for human consumption which are traditionally flavored.

PREFERRED EMBODIMENTS OF THE INVENTION

This compound actually develops a multi-faceted flavor note comprising not only a sulphurous, garlicky, "cat's pee" and metallic quality but also a green, fruity, fatty and meat stock character. This combination and variety of organoleptic properties makes S,S'-ethylidene dithioacetate especially useful in both fruit, and particularly citrus fruit, and savory applications, in particular meat, vegetable or garlic flavorings, as the examples below will demonstrate.

Our invention is based on the surprising discovery that S,S'-ethylidene dithioacetate is a natural constituent of the blood orange and, more particularly, of the juice of that fruit.

Despite the existence of a study of the volatile compounds of blood-orange juice (see Schreier et al, Z. Lebensm. Unters. Forsch. 1977, 164, 188), the presence of the aforementioned compound in the juice was never suspected. It was detected as a result of an extremely complex technique requiring the use of methods involving fractionation techniques combined with gas chromatography.

This natural compound was extracted from blood-orange juice which had been produced by cold-pressing Sicilian oranges. Twenty kilograms of fruit were pressed using a household electric juice extractor, producing 8.7 l of juice. A cold extraction method was chosen, that is to say, Kutscher-Steudel continuous extraction. The juice was diluted in the ratio 1:1 in deionized water and extracted for 4 hours with diethyl ether. After careful evaporation of the solvent in a Vigreux column, the extract had a taste characteristic of that of a fresh blood orange.

This extract was analyzed by flash chromatography on silica gel using pentane/ether in the ratio 9:1 as eluant, followed by direct injection into GC-MS (gas chromatography-mass spectrometry) coupling apparatus. The S,S'-ethylidene dithioacetate detected by this process had a retention time of 37.7 mins in a Supelcowax column (60 m long; I.D. 0.25 mm; T=50°–220° C.; isotherm. 5 mins, 5°/min) and the following mass spectrum:

MS: 178(M+, 3), 163(0.5), 136(2), 135(13), 124(16), 118 (2), 103(7), 93(4), 76(2), 61(8), 60(6), 59(13), 43(100).

The structure of this compound, which was deduced from this mass spectrum, was confirmed by synthesis. It was therefore established that it was in effect the condensation product of thioacetic acid and acetaldehyde, a kind of acetal which can be produced as described by L. Sternson (idem) by a one-stage synthesis in accordance with the following diagram:

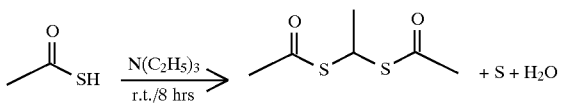

The product thus obtained had the following analytical properties in addition to the mass spectrum set out above:
Purity: 99.9%
NMR($^1$H, 360 MHz): 1.70(d, J=8 Hz, 3H); 2.32(s, 6H); 5,10(q, J=8Hz,1H) 8 ppm
NMR(13C, 90.55 MHz): 22.28(q); 30.26(q); 41.23(d); 193.88(s) 6 ppm Despite the fact that this compound contributes to the characteristic flavor of blood-orange juice and can therefore be used to reproduce it, particularly when used in relatively dilute concentrations, its organoleptic properties are such that it has been found to have very much wider applications. It can in fact be very widely used as a flavoring ingredient.

In general terms, it has been found to be extremely advantageous in all citrus flavoring compositions, and more particularly in grapefruit type flavors, where it enhances juiciness and pulpiness. The typical sulphur note characteristic of grapefruit-type flavors has hitherto been obtained with known compounds such as 8-mercapto-3-p-methanone (see, for example, U.S. Pat. No. 4,224,351), 2-methyl-4-propyl-1,3-oxathiane (see, for example, U.S. Pat. No. 4,220, 561) or 1-p-menthene-8-thiol (see, for example, U.S. Pat. No. 4,478,865). Yet we were surprized to find that S,S'-ethylidene dithioacetate could be successfully used for this purpose in place of these compounds. Furthermore, while 8-mercapto-3-p-methanone imparts a more volatile hint of sulphur, the compound of the invention gives a juicier, pulpier quality.

Secondly, when added to other fruit, particularly tropical fruit, compositions, the compound of the invention made them juicier and fresher and enhanced the fruity quality.

Its organoleptic properties also had a marked and very positive effect in onion and garlic compositions or in meaty or even peanut and other nut compositions.

The value of this compound as a flavoring ingredient is all the greater in view of the fact that it has a very powerful flavor note. Even at concentrations of the order of 10 to 50 ppb (parts per billion), its flavor can still be detected in acidified sugar solution. The concentrations at which S,S'-ethylidene dithioacetate can be added to flavoring compositions and to products which are to be flavored in order to impart the above effects vary over a very wide range of values, from the aforementioned lower limit to values of the order of 5 ppm or even 20 or 50 ppm (parts per million) by weight of the composition or product in which it is incorporated.

The compound is suitable for the flavoring of various products such as foodstuffs, beverages, chewing gum, toothpastes or pharmaceutical preparations.

The foods which can be flavored include ice creams, dessert whips and mousses, yoghurts, milk products in general, confectionery, cakes and pastries, cordials or syrups, boiled sweets, jams or soups and stock, extracts for the preparation of soups and sauces, sauces in general, spices, meat products and ready-cooked meals. Cocktail snacks, crisps and the like could also be mentioned.

S,S'-ethylidene dithioacetate is incorporated in the foods, beverages, chewing gum, toothpastes or pharmaceutical preparations to be flavored, by the methods which are customary in the art, either on its own or mixed with other natural or synthetic flavoring ingredients. It can be used neat or in solution in one of the conventional edible solvents such as triacetin, ethyl alcohol or propylene glycol or mixed on a solid substrate such as a dextrin or arabic gum.

It was also found that the aforementioned compound was of interest to the perfume industry. It has a very natural sulphurous odor with a very attractive herbaceous quality and leathery edge. It is actually a multi-odor product which also develops hints of garlic, onion, galbanum or bergamot notes, reminiscent of the bergamot leaf absolute.

Its odor is also very powerful. For example, when a single bouquet was made from an essential oil of Florida orange with 40 parts by weight of a dipropylene glycol (DIPG) solution containing 0.01% by weight of this compound for one thousand parts of the essence, a pronounced, very useful odor effect was perceived: this compound had contributed a very natural, diffusible hint of bitterness reminiscent of the smell of bitter orange. It can therefore be used in even very dilute concentrations, for example of the order of 0.001% by weight up to 0.005% by weight or more according to the application.

Its odor is also lasting, which is unusual for substances with sulphur notes.

S,S'-ethylidene dithioacetate can be advantageously used for the preparation of perfuming compositions and perfumed products for both fine perfumery and functional applications. The perfumed products referred to include perfumes or eaux de toilette, soaps, shower or bath gels, shampoos and other hair care products, cosmetics, deodorants and air fresheners. It is also a useful ingredient for perfuming detergents for linen, dishwashing agents, fabric softeners and cleaning products.

When used for these applications and as stated above, advantageous olfactory effects can be achieved with low concentrations. The person skilled in the art is able to select the concentrations according to the type of product to be perfumed and the intensity of the perfuming effect required.

In these applications it may likewise be used either on its own or in combination with other perfuming ingredients, conventional solvents or additives. It is superfluous to list these other ingredients here in more detail, since the skilled person is able to select them on the basis of his own experience and by drawing on reference works such as S. Arctander's book, "Perfume and Flavor Chemicals, Montclair, N.J. (1969).

We found that this compound is compatible with a wide variety of perfuming ingredients and that it can make advantageous contributions both to classic colognes and to compositions which are fruity or floral, green, woody or, of course, a mixture of these. In the opinion of the expert perfumers, it may also be useful and advantageous in typical applications of other known sulphurous products such as 8-mercapto-3-p-methanone, which is not as easy to use as the compound of the invention, or 2-methyl-4-propyl-1,3-oxathiane.

The invention will now be described in more detail by means of the following examples.

EXAMPLE 1

Flavoring compositions

Flavoring compositions according to the invention were prepared by adding a solution of 1% by weight of S,S'-ethylidene dithioacetate in ethanol (Solution S) to a variety of basic flavorings as listed below. The Solution S concentrations used are shown in the Table in % by weight of the weight of the relevant composition.

| Compositions (type) | Type of basic flavoring | Solution S, % by weight |
| --- | --- | --- |
| A | passion fruit No. 502010 A* | 0.3–0.5 |
| B | pineapple No. 502434 A* | 0.3–0.5 |
| C | mango No. 55508 A* | 0.5–1 |
| D | guava No. 502025 A* | 0.3–0.5 |
| B | durian No. 502652 A* | 2.0–5.0 |
| F | blackcurrant No. 5002009 A* | 0.5 |

*manufactured by Firmenich SA, Geneva, Switzerland

All the flavoring compositions were tested at 0.1% by weight in acidified sugar water (10% sugar, 0.1% citric acid) and compared in a blind tasting with the aforementioned basic flavorings, which were tasted under the same conditions.

In the opinion of the panel of expert flavorists which carried out these tests, all the compositions of type A to F were preferred to the aforementioned corresponding basic flavorings, since the addition of Solution S had generally made them taste juicier, fresher and fruitier.

EXAMPLE 2

Flavoring a blackcurrant syrup 0.2% by weight of a solution of 0.01% by weight of S,S'-ethylidene dithioacetate in ethanol was added to a basic, commercially available blackcurrant syrup. The flavored syrup thus produced and the basic syrup were diluted in water at a ratio of one part syrup to 4 parts water and were then compared in a blind tasting by a panel of flavoring experts. The experts preferred the syrup with the flavoring according to the invention, commenting that it had a fresher taste than the basic syrup and a stronger and more characteristic blackcurrant juice quality.

EXAMPLE 3

Orange and grapefruit compositions 0.01 ppm of S,S'-ethylidene dithioacetate was added to a solution of an essential oil of orange rind (200 ppm) in acidified sugar water (10% sugar, 0.1% citric acid). When a panel of expert flavorists tasted the new flavored solution produced in this way, the solution was found to have acquired a juicier, pulpier tone.

The same organoleptic effect was observed when 0.01 ppm of the aforementioned compound was added to a mixture of 200 ppm of orange terpenes (manufactured by Firmenich SA, Geneva, Switzerland) in acidified sugar water; it was also found to have acquired a grapefruit tone.

EXAMPLE 4

Savory flavoring compositions 0.5 ppm of S,S'-ethylidene dithioacetate was added to a basic aqueous salt solution (0.5% NaCl) containing 50 ppm of a fried onion flavor (503679 TH; manufactured by Firmenich SA, Geneva, Switzerland). The new solution thus produced was compared with the basic solution by a panel of flavorists in a blind tasting. In the experts' opinion, the new solution tasted thicker, with more of a barbecued, grilled quality. A similar test was carried out with 30 ppm of a barbecued beef flavoring (504015 TH; manufactured by Firmenich SA, Geneva, Switzerland) in a salt solution to which 0.05 ppm of the aforementioned compound was added. The addition of this compound again had an interesting effect, in that the flavor acquired a juicier quality with enhanced grilled, bloody notes and a generally stronger taste. The addition of 0.5 ppm of S,S'-ethylidene dithioacetate to 100 ppm of a peanut flavor (502503 AH; manufactured by Firmenich SA, Geneva, Switzerland) in a salt solution also produced a rounder flavor and made it more natural and more like genuine peanut taste.

EXAMPLE 5

Grapefruit flavoring composition

A basic grapefruit flavoring composition was prepared using the following ingredients:

| Ingredients | Parts by weight |
| --- | --- |
| Acetaldehyde | 25 |
| Styralyl acetate | 25 |
| trans-2-Hexenol | 10 |
| Orange terpenes* | 940 |
| Total | 1000 |

*manufactured by Firmenich SA, Geneva, Switzerland

To 200 ppm of this basic composition in acidified sugar water were added 1.5 parts by weight of a 1% solution of 8-mercapto-3-p-methanone in orange terpenes to produce a composition A and 5 parts by weight of a 1% solution of S,S'-ethylidene dithioacetate in orange terpenes to produce a new composition B. These two compositions A and B were then compared in a blind tasting by expert flavorists, who found that composition B had a juicier and pulpier grapefruit quality than did composition A.

EXAMPLE 6

Perfuming composition

A basic perfuming composition was prepared by mixing the following ingredients in the stated proportions:

| Ingredients | Parts by weight |
| --- | --- |
| 10%* Aldehyde $C_8$ | 5 |
| 1%* Aldehyde $C_9$ | 5 |
| 50%* 15-pentadec-(11,12)-enolide[1] | 5 |
| Hedione ®[2] | 5 |
| Geranyl acetate | 15 |
| 10%* Aldehyde $C_{10}$ | 15 |
| Neroli oil | 15 |
| Mandarin oil | 15 |
| Benzoin resinoid | 20 |
| Benzyl benzoate | 200 |
| Bergamot oil | 300 |
| Lemon oil | 400 |
| Total | 1000 |

*in dipropylene glycol
[1] manufactured by Firmenich SA, Geneva, Switzerland
[2] methyl dihydrojasmonate; manufactured by Firmenich SA, Geneva, Switzerland 40 parts by weight of a solution of 0.01% by weight of S,S'-ethylidene dithioacetate in DIPG were added to this basic classic cologne composition. This produced a new perfuming composition in which the rich, natural neroli fragrance had been distinctly accentuated and the bitter quality of the neroli note enhanced by comparison with the basic composition. The new composition also had more spark, producing a more original sensation.

I claim:

1. A perfuming composition or a perfumed product comprising S,S'-ethylidene dithioacetate as an active perfuming ingredient.

2. A perfumed product as claimed in claim 1, in the form of a perfume or eau de toilette, a soap, a shower or bath gel, a shampoo or other hair care product, a cosmetic, a deodorant or air freshener, a detergent or fabric softener or a cleaning product.

3. A flavoring composition or a flavored product comprising as an active flavoring ingredient S,S'-ethylidene dithioacetate in its substantially pure form and not accompanied by substances of natural origin which are present in blood orange juice.

4. A flavoring composition or flavored product as claimed in claim 3, characterized in that the concentration of S,S'-ethylidene dithioacetate is between approximately 10 ppb and 50 ppm of the total weight of the composition or product.

5. A flavored product as claimed in claim 3, in the form of a food or beverage, chewing gum or pharmaceutical preparation.

6. A perfuming composition or a perfumed product comprising S,S'-ethylidene dithioacetate present in an amount from about 0.001 weight percent to 1 weight percent of the composition as an active perfuming ingredient.

7. The perfumed product as claimed in claim 6 in the form of a perfume or eau de toilette, a soap, a shower or bath gel, a shampoo or other hair care product, a cosmetic, a deodorant or air freshener, a detergent or fabric softener or a cleaning product.

8. The flavoring composition or flavoring product of claim 3 comprising S,S'-ethylidene dithioacetate present in an amount from about 0.001 weight percent to 1 weight percent of the composition as an active flavoring agent.

9. The flavoring composition or flavoring product of claim 3 wherein the flavoring composition of flavoring product comprises a fruity taste.

* * * * *